(12) United States Patent
Fukuoka et al.

(10) Patent No.: US 6,421,378 B1
(45) Date of Patent: Jul. 16, 2002

(54) SIGNAL WAVEFORM EQUALIZER APPARATUS

(75) Inventors: Toshihiko Fukuoka; Daisuke Hayashi, both of Osaka; Takaya Hayashi, Kyoto; Shigeru Soga, Osaka, all of (JP)

(73) Assignee: Matsushita Electric Industrial Co. Ltd., Kadoma (JP)

( * ) Notice: Subject to any disclaimer, the term of this patent is extended or adjusted under 35 U.S.C. 154(b) by 0 days.

(21) Appl. No.: 09/165,204

(22) Filed: Oct. 2, 1998

(30) Foreign Application Priority Data

Oct. 7, 1997 (JP) .............................. 9-274073

(51) Int. Cl.[7] .............................................. H03H 7/30
(52) U.S. Cl. ........................................ 375/229; 375/344
(58) Field of Search .......................... 375/229, 232, 375/230, 233, 235, 344, 350; 333/28 R, 18; 381/103, 98; 708/323

(56) References Cited

U.S. PATENT DOCUMENTS

| | | | | |
|---|---|---|---|---|
| 5,291,298 A | * | 3/1994 | Senuma et al. ............... | 386/13 |
| 5,297,165 A | * | 3/1994 | Ueda et al. .................. | 375/230 |
| 5,710,792 A | * | 1/1998 | Fukawa et al. .............. | 375/229 |
| 5,970,092 A | * | 10/1999 | Currivan ...................... | 375/232 |
| 6,108,151 A | * | 8/2000 | Tuttle et al. ................. | 360/51 |
| 6,211,924 B1 | * | 4/2001 | Patel et al. ................... | 348/726 |

OTHER PUBLICATIONS

S. Soga et al., "A study of Synchronization scheme for carrier recovery of multilevel QAM", ITE Technical Report vol. 21, No. 21, pp. 13–18, Mar., 1997.

* cited by examiner

Primary Examiner—Chi Pham
Assistant Examiner—Emmanuel Bayard
(74) Attorney, Agent, or Firm—Eric J. Robinson; Nixon Peabody LLP

(57) ABSTRACT

Integrating AFC/APC function with waveform equalization function for and reducing the circuit size of a signal waveform equalizer apparatus. A waveform equalization section is divided into an FFE block as an anterior stage and a DFE block as a posterior stage. An AFC/APC block is provided therebetween. In the AFC/APC block, an AFC/APC coefficient update section updates a coefficient used for removing frequency and phase errors in accordance with an LMS algorithm, and a tap multiplies a modulated signal by the updated coefficient. Error data produced by an error estimation block is used by not only FFE and DFE coefficient update sections but also the AFC/APC coefficient update section for updating the coefficients. That is to say, the waveform equalization section and the AFC/APC block use the error estimation block in common, thereby reducing the circuit size considerably.

6 Claims, 14 Drawing Sheets

SIGNAL WAVEFORM EQUALIZER APPARATUS

BACKGROUND OF THE INVENTION

The present invention relates to a signal waveform equalizer apparatus used for a receiver unit in multivalued digital microwave communication.

In recent years, modulation/demodulation technique for digital microwave communication has tended to further increase the value thereof in order to utilize frequencies even more effectively. For example, not only QPSK and 16 QAM modulation techniques but also 64 QAM and 256 QAM modulation techniques and so forth are adopted in some cases.

As the value of modulation/demodulation is increased in this way, the more seriously signal quality is affected by distortion and the like generated in a transmission line. Thus, techniques for ensuring signals of normal quality for a receiver unit become more and more important. In order to meet such demand, an automatic adaptive equalizer for equalizing the signal, which has been received at a receiver unit through a transmission line, is provided.

FIG. 13 is a block diagram illustrating a transmission line and an exemplary equalization system therefor. As shown in FIG. 13, the quality of a signal, which has been transmitted by a transmitter, is varied in accordance with the characteristics of a transmission line, noise is added thereto and then the signal with a deformed waveform is received. Thus, the transmitted signal is affected by a ghost signal, which is received at a delayed time because of the influence of reflected waves and the like, so as to have a distorted waveform. Also, noise and the like cause phase and frequency errors in the signals. Affected by various complicated factors such as these, a signal having a different waveform than that of an originally transmitted signal is received by a receiver unit.

Thus, in the receiver unit, an equalizer is inserted to be serially connected to a receiver at a stage preceding the receiver, thereby equalizing a received signal $X_0$ into a signal $Z_0$ preferred by the receiver. And then, in order to restore original carrier waves, auto frequency control (AFC) and auto phase control (APC) are performed for removing frequency and phase errors, respectively.

If the noise is very small, equalization may be performed by an equalizer having a characteristic inverse of the transfer function of the transmission line. However, if the noise reaches a certain level, the equalizer must be designed taking the noise into consideration. In actuality, the equalizer is made up of digital filters, and such an equalizer is called a "digital equalizer".

FIG. 14 is a block diagram illustrating an exemplary configuration for a digital filter. In FIG. 14, $X_0$ denotes a received signal input through the transmission line, $X_1$ through $X_m$ are signals obtained by making respective delay devices delay the received signal $X_0$, and $C_0$ through $C_m$ denote respective equalization coefficients. The received signal $X_0$ is multiplied by the equalization coefficient $C_0$ by a multiplier. In a similar manner, the signals $X_1$ through $X_m$ are respectively multiplied by the equalization coefficients $C_1$ through $C_m$ by respective multipliers. The products obtained by the respective multipliers are added by an adder and the sum is output as an equalized signal $Z_0$. In a digital filter, a component for multiplying a delayed signal by an associated equalization coefficient is called a "tap". As described above, the equalized signal $Z_0$ is obtained by adding the products obtained by the respective taps. In this case, optimum equalization coefficients $C_0$ through $C_m$ most suitable for restoring the original signal must be calculated. An least mean square (LMS) algorithm is ordinarily used for calculating the equalization coefficients.

In accordance with a conventional technique (see Japanese Laid-Open Publication No. 7-66843), AFC/APC is implemented by a phase error detector, a loop filter and a digital VCO.

As described above, since an equalizer is made up of digital filters, complex multiplication is required. As the number of taps of the filter increases, the circuit size and the power consumption thereof also increase considerably. Also, in performing AFC/APC, a loop filter requires sum-of-products operations. Moreover, a digital VCO generally includes a means for storing data. Thus, if the number of bits of a signal is large, then the digital VCO requires an enormous storage capacity. From these points of view, it is an important problem to solve for a signal waveform equalizer apparatus to reduce the circuit size thereof.

On the other hand, as shown in FIG. 13, waveform equalization and AFC/APC cannot be completed in a single series of processing. Specifically, a signal, which has been subjected to AFC/APC, is fed back to the equalizer so as to equalize the waveform thereof again. Accordingly, waveform equalization and AFC/APC are repeatedly performed until the signal reaches and converges to a predetermined level. Ultimately, the signal is intended to be equalized and free from frequency and phase errors substantially simultaneously. In other words, the respective functions are not to be performed in such an independent manner that a signal is first equalized by waveform equalization and then errors are removed from the signal by AFC/APC. The effects of these two types of processing should be mutually enhanced by performing the equalization and AFC/APC simultaneously. Originally, equalization and AFC/APC are so closely correlated processes that it is hard to draw fully satisfactory results therefrom if these processes are performed independently. However, conventionally, there has been no block sharing these functions in common and these functions have been implemented by respectively independently components.

SUMMARY OF THE INVENTION

The object of this invention is providing a signal waveform equalizer apparatus of a reduced circuit size by integrating AFC/APC function with waveform equalization function.

Specifically, the present invention provides a signal waveform equalizer apparatus for equalizing the waveform of a signal, subjected to multivalued modulation and transmitted, with the waveform of an original signal yet to be transmitted The apparatus includes: a waveform equalization section for equalizing the input modulated signal in accordance with a least mean square (LMS) algorithm; an error estimation block for producing error data required for the waveform equalization section to update equalization coefficients; and an auto frequency control (AFC)/auto phase control (APC) block for removing frequency and phase errors from the input modulated signal. The AFC/APC block removes the frequency and phase errors from the input modulated signal in accordance with the LMS algorithm and updates the coefficients by using the error data produced by the error estimation block.

The signal waveform equalizer apparatus of the present invention includes: the waveform equalization section for equalizing the waveform of the modulated signal with the original one; and the AFC/APC block for removing frequency and phase errors from the modulated signal. And the AFC/APC block uses the error estimation block in common with the waveform equalization section. Accordingly, the function blocks implementing the waveform equalization and AFC/APC are not independent of each other, the AFC/APC function can be integrated into the signal waveform equalizer apparatus and the circuit size thereof can be considerably reduced.

In one embodiment of the present invention, the waveform equalization section is preferably divided into an anterior stage and a posterior stage. The modulated signal, output from the anterior stage of the waveform equalization section, is preferably input to the AFC/APC block and an output signal of the AFC/APC block is preferably input to the posterior stage of the waveform equalization section.

In another embodiment of the present invention, the anterior stage of the waveform equalization section is preferably a feed forward equalizer (FEE) block and the posterior stage of the waveform equalization section is preferably a decision feedback equalizer (DFE) block.

In still another embodiment of the present invention, the FFE block preferably includes an FFE filter section that is divided into an FFE pre-filter and an FFE post-filter. The DFE block preferably includes a DFE filter section that is divided into a DFE pre-filter and a DFE post-filter. And each of the FFE pre- and post-filters and the DFE pre- and post-filters preferably includes a complex operation macro having the same configuration.

The present invention also provides another signal waveform equalizer apparatus for equalizing the waveform of a signal, which has been subjected to multivalued modulation and transmitted, with the waveform of an original signal yet to be transmitted. The apparatus includes: a waveform equalization section for equalizing the input modulated signal in accordance with an LMS algorithm; and an AFC/APC block for removing frequency and phase errors from the input modulated signal. The AFC/APC block includes a single tap for multiplying the input modulated signal by a coefficient for removing the frequency and phase errors, and an AFC/APC coefficient update section for updating the coefficient in accordance with the LMS algorithm.

The signal waveform equalizer apparatus of the present invention includes: the waveform equalization section for equalizing the waveform of the modulated signal with the original one; and the AFC/APC block for removing frequency and phase errors from the modulated signal. And the AFC/APC block operates in accordance with the LMS algorithm in the same way as the waveform equalization section. Accordingly, since waveform equalization and AFC/APC can be implemented by similar components, the AFC/APC function can be integrated into the signal waveform equalizer apparatus and the circuit size thereof can be considerably reduced.

In one embodiment of the present invention, the waveform equalization section is preferably divided into an anterior stage and a posterior stage, each of these stages including a filter section and a coefficient update section. The modulated signal, output from the anterior stage of the waveform equalization section, is preferably input to the AFC/APC block and an output signal of the AFC/APC block is preferably input to the posterior stage of the waveform equalization section. And the filter sections of the anterior and posterior stages of the waveform equalization section preferably have the same number of taps.

DETAILED DESCRIPTION OF THE INVENTION

Figure 1:
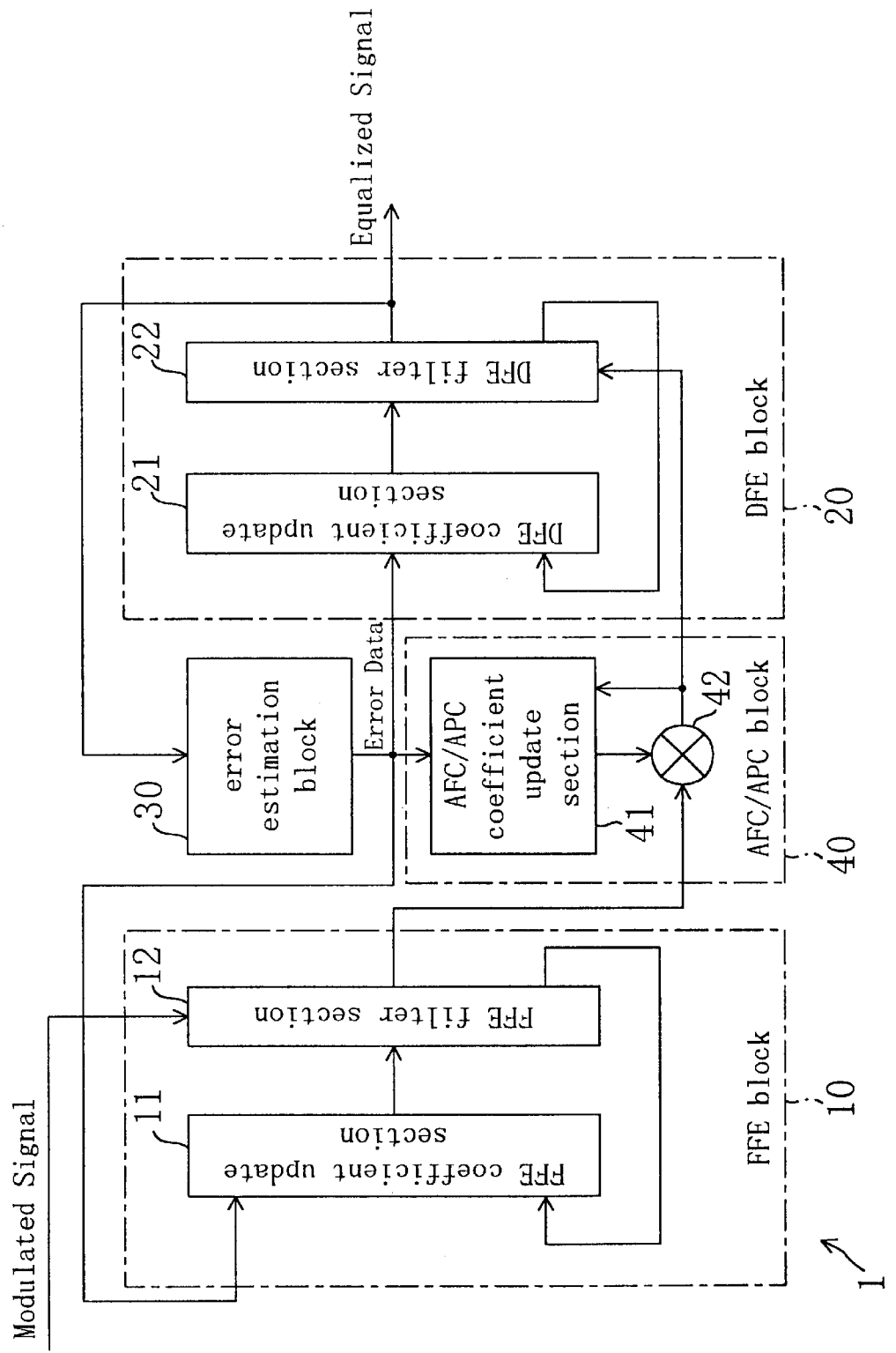
FIG. 1 is a block diagram illustrating a general configuration for the signal waveform equalizer apparatus of the present invention.

FIG. 1 is a block diagram illustrating a general configuration for the signal waveform equalizer apparatus of the present invention. In FIG. 1, the reference numeral 10 denotes a feed forward equalizer (FFE) block, which is the anterior stage of a waveform equalization section 1 for equalizing the waveform of a modulated signal. 20 denotes a decision feedback equalizer (DFE) block, which is the posterior stage of the waveform equalization section 1. 30 denotes an error estimation block. 40 denotes an auto frequency control (AFC)/auto phase control (APC) block for removing frequency and phase errors from the modulated signal. The FFE block 10 includes an FFE coefficient update section 11 and an FFE filter section 12. The DFE block 20 includes a DFE coefficient update section 21 and a DFE filter section 22. And the AFC/APC block 40 includes an AFC/APC coefficient update section 41 and a tap 42.

The signal waveform equalizer apparatus of the present invention shown in FIG. 1 receives a modulated signal, which has been subjected to multivalued modulation and transmitted, converts the signal into an equalized signal and then outputs the equalized signal. First, the modulated signal received is equalized by the FFE block 10, which is the anterior stage of the waveform equalization section 1. Then, the equalized signal is input to the AFC/APC block 40, which removes frequency and phase errors from the signal.

The modulated signal, output from the AFC/APC block 40, is further equalized by the DFE block 20, which is the posterior stage of the waveform equalization section 1. And then the signal is output as an equalized signal from the signal waveform equalizer apparatus.

According to the present invention, the waveform equalization section 1 and the AFC/APC block 40 both operate in accordance with an LMS algorithm and to update coefficients by using error data produced by the error estimation block 30.

An algorithm for producing an equalization coefficient in the waveform equalization section 1 will be described.

The quality of a signal transmitted by a transmitter are varied in accordance with the characteristics of a transmission line. And the signal is provided to a receiver with noise added thereto. If the characteristics of the transmission line are constant, then characteristics inverse of those of the transmission line should be calculated and a constant equalization coefficient realizing the inverse characteristics calculated may be used. In a system in which the influence and characteristics of noise are varied perpetually, however, the equalization coefficient should be successively updated in accordance with the states of the received signal. A so-called "automatic adaptive algorithm" is used for updating the equalization coefficient. In actuality, a next equalization coefficient is calculated based on an equalization coefficient in a previous state. In such a case, a certain index of estimation is set and the equalization coefficient is updated so as to minimize the value. A least mean square (LMS) algorithm is a typical example of such an algorithm.

In accordance with the LMS algorithm, a mean-square error is used as the index of estimation for the equalization coefficient. Specifically, the equalization coefficient is defined as represented by the following Equation (1):

$$C_{n+1, m} = C_{n, m} - \alpha \times X_m \times e_0 \qquad (1)$$

where n is a number of times the equalization coefficient is updated; m is a tap number of the equalization coefficient; $e_0 = Z_0 - \chi_0$ (where $\chi_0$ is an original signal yet to be transmitted); and α is a step size.

In this case, if the signal $X_m$ and the error data $e_0$ are represented as complex numbers by the following equations:

$$X_m = X_{m(r)} - jX_{m(i)}$$

$$e_0 = e_{0(r)} + je_{0(i)}$$

(in this specification, (r) indicates real part data and (i) indicates imaginary part data), then $$X_m \times e_0 = (X_{m(r)} \times e_{0(r)} + X_{m(i)} \times e_{0(i)}) + j(X_{m(r)} \times e_{0(i)} - X_{m(i)} \times e_{0(r)})$$

Thus, Equation (1) is modified as:

$$C_{n+1, m(r)} = C_{n, m(r)} - \alpha \times (X_{m(r)} \times e_{0(r)} + X_{m(i)} \times e_{0(i)}) \qquad (2)$$

$$C_{n+1, m(i)} = C_{n, m(i)} - \alpha \times (X_{m(r)} \times e_{0(i)} + X_{m(i)} \times e_{0(r)}) \qquad (3)$$

However, in an actual transmission system, since the original signal $\chi_0$ yet to be transmitted is unknown to a receiver unit, the original signal cannot be used for calculating the error data $e_0$. Thus, it is required for the receiver unit to estimate the original signal yet to be transmitted and to equalize the waveform using the estimate as a reference signal. Such an algorithm is called a "blind algorithm". If an equalization coefficient is repeatedly updated several thousand times under some constraint in accordance with the blind algorithm, then the equalization coefficient converges, thereby realizing equalization of the signal waveform.

In accordance with a STOP & GO algorithm, it is determined based on the directions of vectors representing an LMS error and a Sato error whether or not a coefficient should be updated in complex multiplication. First, an LMS error is defined as follows:

$$LMSER = Z_0 - D$$

where LMSER is an LMS error and D is a reference signal. Next, a Sato error is defined as follows:

$$B = E(|An|^2)/E(|An|)$$

where B is a reference value of a Sato error, An is the vector of a reference signal and E( ) denotes an average.

The Sato error SATER is given by:

$$SATER = Z_0 - B$$

Figure 11:
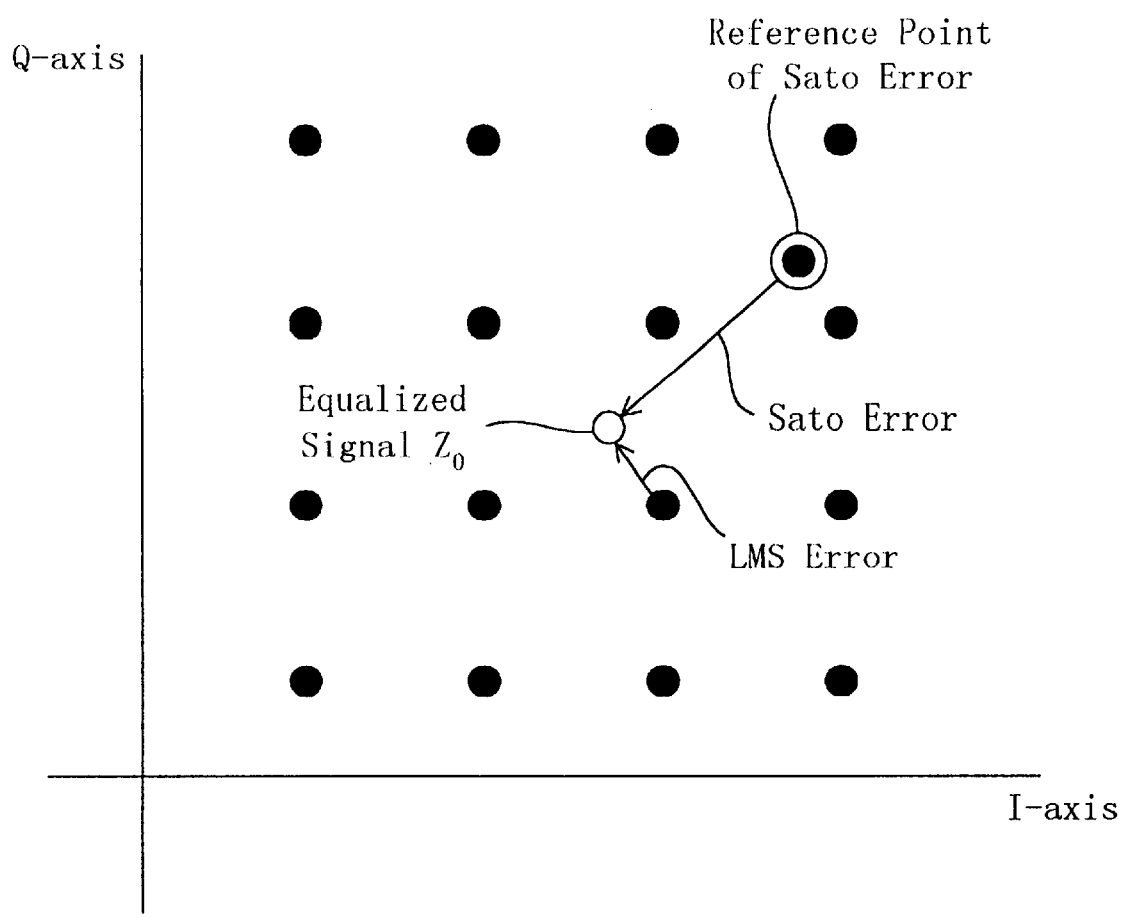
FIG. 11 is a diagram for illustrating an LMS error and a Sato error in QAM.

FIG. 11 is a diagram illustrating the first quadrant of a 64 QAM phase diagram and showing the relationship between an LMS error and a Sato error. In FIG. 11, solid circles represent the positions of signal points and the circled solid circle represent the reference point of the Sato error. Assuming the equalized signal $Z_0$ is located at the position represented by the open circle in FIG. 11, the LMS error and the Sato error are represented by respective vectors shown in FIG. 11. The reference point of the Sato error exists in each quadrant. That is to say, there are four reference points for the Sato error. On the other hand, the reference points of the LMS error are located at the respective signal points. In 64 QAM, there are 64 reference points in total for the LMS error.

In accordance with the STOP & GO algorithm, the equations for updating the equalization coefficient are modified as follows:

$$C_{n+1, m(r)} = C_{n, m(r)} - \alpha \times (X_{m(r)} \times e_{0(r)} \times f_r + X_{m(i)} \times e_{0(i)} f_i) \qquad (4)$$

$$C_{n+1, m(i)} = C_{n, m(i)} - \alpha \times (X_{m(r)} \times e_{0(i)} \times f_i - X_{m(i)} \times e_{0(r)} f_r) \qquad (5)$$

where $f_r$ and $f_i$ are flags independently calculated for the real axis and the imaginary axis and are defined on the following conditions:

$f_r = 1$; sgn (I component of LMSER)=sgn (I component of SATER) 0; sgn (I component of LMSER)≠sgn (I component of SATER)

$f_i = 1$; sgn (Q component of LMSER)=sgn (Q component of SATER) 0; sgn (Q component of LMSER)≠sgn (Q component of SATER)

Assuming $e_{0(r)} \times f_r$ and $e_{0(i)} \times f_i$ are denoted by EI and EQ, respectively, Equations (4) and (5) are rewritten as:

$$C_{n+1, m(r)} = C_{n, m(r)} - \alpha \times (X_{m(r)} \times EI + X_{m(i)} \times EQ) \qquad (6)$$

$$C_{n+1, m(i)} = C_{n, m(i)} - \alpha \times (X_{m(r)} \times EQ - X_{m(i)} \times EI) \qquad (7)$$

In this specification, EI and EQ will be called "error data".

The waveform equalizer of the present invention updates the equalization coefficient in accordance with Equations (6) and (7).

According to the present invention, the AFC/APC block 40 performs the frequency correction and the phase correction in accordance with the LMS algorithm, too. Equations for updating correction coefficients are as follows:

$$H_{n+1} = H_n F_n + \mu(D_n - H_n U_n) U_n^* \qquad (8)$$

$$F_{n+1} = F_n + \mu f(H_{n+1} - F_n H_n) H_n^* \qquad (9)$$

where $H_n$ is a phase correction coefficient, $F_n$ is a frequency correction coefficient, $D_n$ is a decision signal, $U_n$ is an input signal, $\mu$ and $\mu f$ are step sizes and * denotes a conjugate complex number. By using these equations in accordance with the LMS algorithm, the frequency and phase errors can be corrected simultaneously. In Equation (8), $(D_n-H_nU_n)$ is equivalent to the error data in the STOP & GO algorithm for obtaining the equalization coefficient, which may be the error data output from the error estimation block 30.

A signal, from which errors have been removed, is represented by $H_nU_n$. In this algorithm, since the component of $F_n$ is included in $H_n$, $H_nU_n$ is a signal in which both the phase and frequency errors have been corrected. An ultimate signal, which has been subjected to AFC/APC, is $H_nU_n{}^*$.

Embodiment 1

Figure 2:
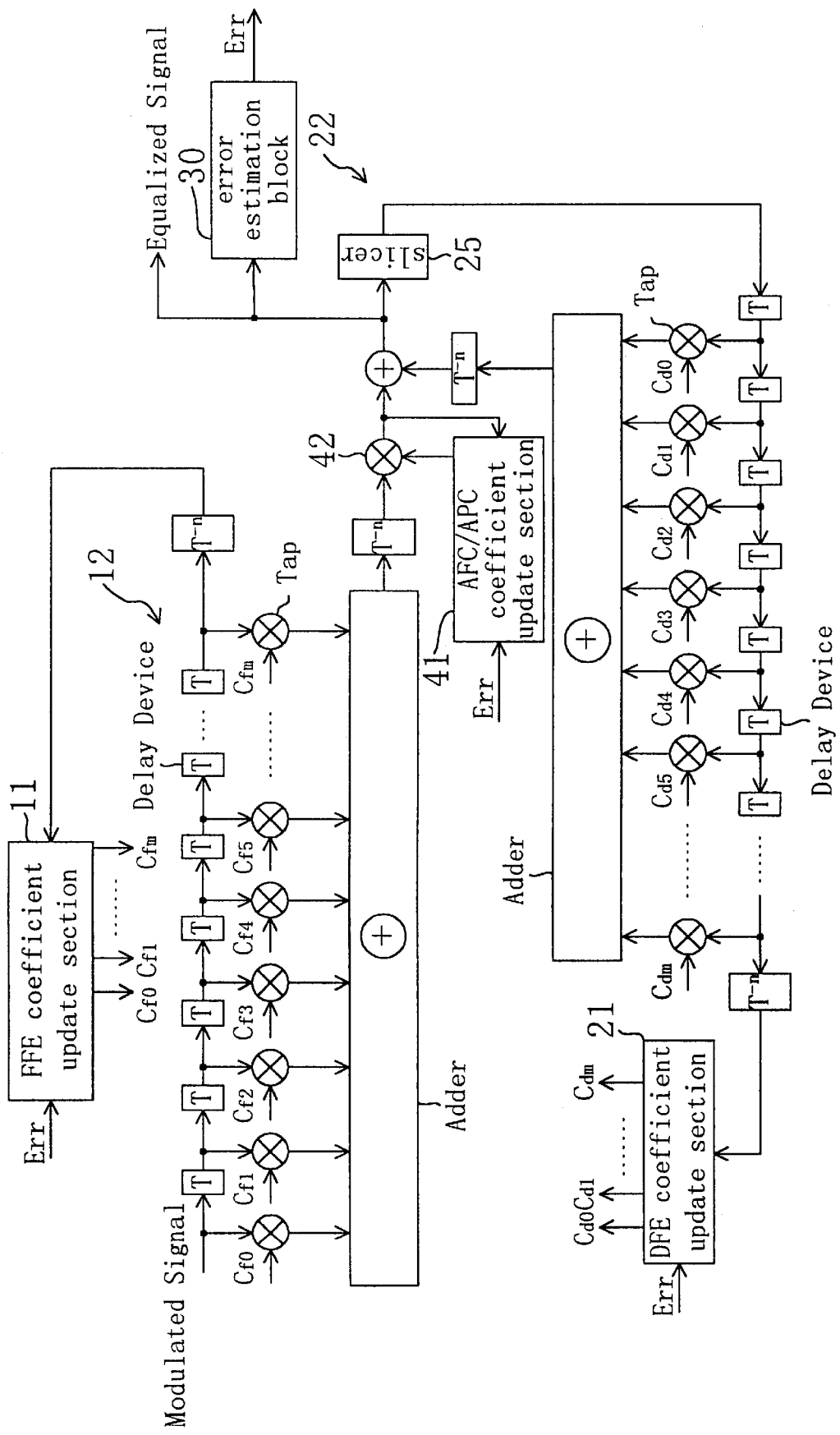
FIG. 2 is a diagram illustrating a configuration for a signal waveform equalizer apparatus in the first embodiment of the present invention.
Figure 12:
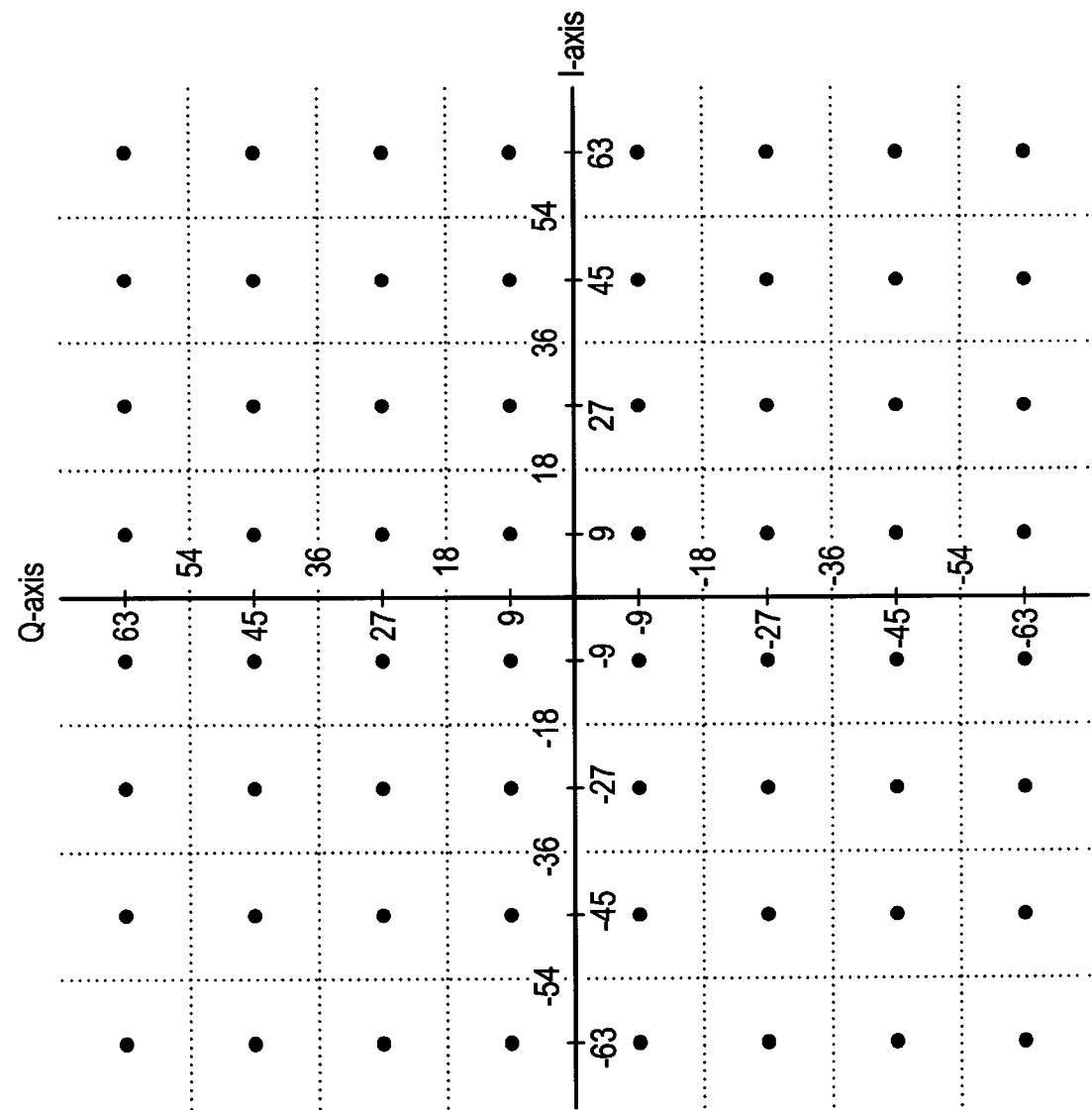
FIG. 12 is a phase plane diagram for 64 QAM showing slice levels and positions of signal points.
Figure 13:
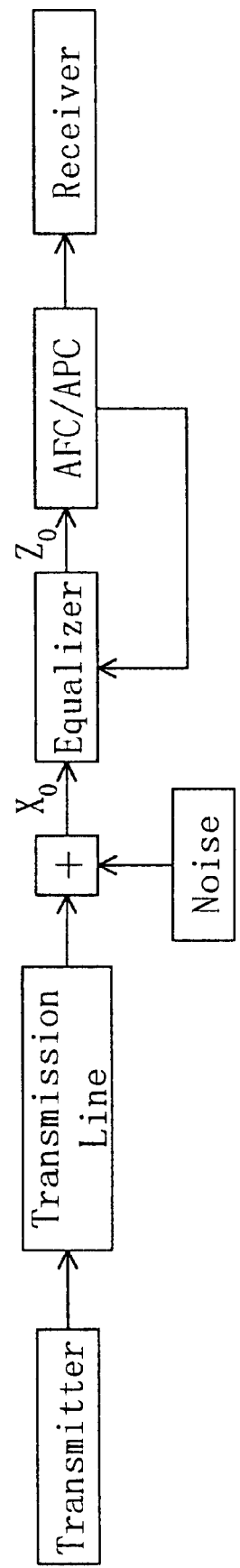
FIG. 13 is a block diagram illustrating a transmission line and an exemplary equalization system therefor.
Figure 14:
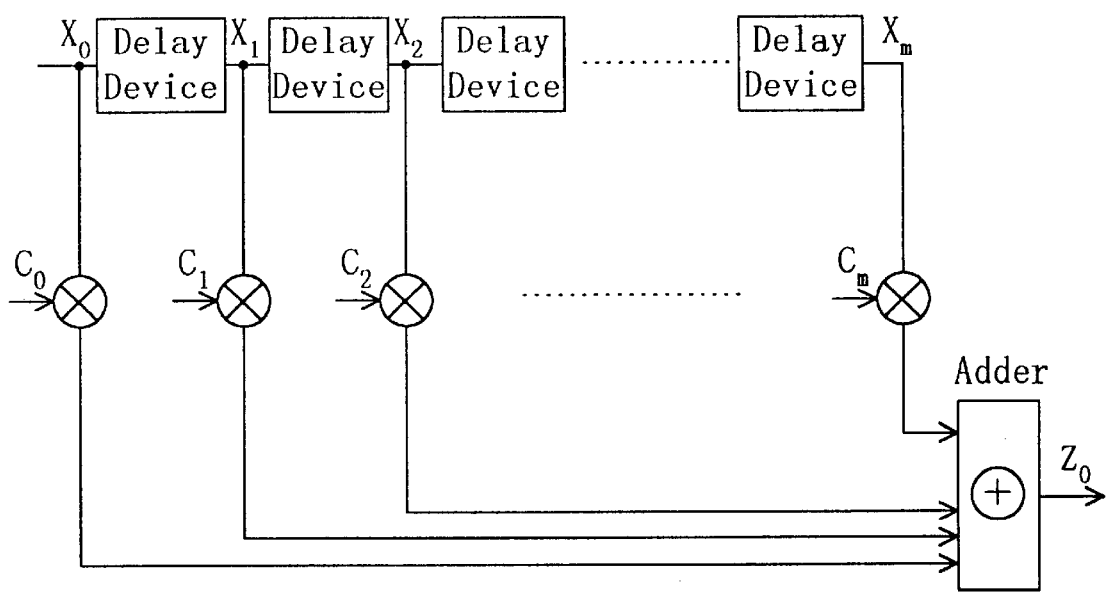
FIG. 14 is a diagram illustrating a configuration for a digital equalizer.

FIG. 2 is a diagram illustrating a configuration for a signal waveform equalizer apparatus in the first embodiment of the present invention. In FIG. 2, an FFE filter section 12 includes: a number (m+1)(where m is a positive integer) of taps; delay devices; and an adder. Equalization coefficients $C_{f0}$ through $C_{fm}$ updated by an FFE coefficient update section 11 are provided to the respective taps on the other hand, a DFE filter section 22 includes: a slicer 25; a number (m+1) of taps; delay devices; and an adder. Equalization coefficients $C_{d0}$ through $C_{dm}$ updated by a DFE coefficient update section 21 are provided to the respective taps. The slicer 25 determines which of the regions defined by the broken lines on such a phase plane diagram as that shown in FIG. 12 (in which 64 QAM is performed) the modulated signal belongs to. Then, the slicer 25 outputs a signal corresponding to the signal point existing in the region (decision signal). For example, if the real part (I data) of a modulated signal is 13 and the imaginary part (Q data) thereof is 15, the slicer 25 outputs a decision signal, in which I data=9 and Q data=9.

The error data Err produced by the error estimation block 30 is input to the FFE coefficient update section 11, the DFE coefficient update section 21 and the AFC/APC coefficient update section 41 and used for updating the respective coefficients.

In this embodiment, the AFC/APC block 40 is disposed just at the center of the waveform equalization section 1. That is to say, the number of taps of the FFE block 10 as the anterior stage of the waveform equalization section 1 is equal to the number of taps of the DFE block 20 as the posterior stage thereof. This arrangement is employed to simplify the circuit configuration and thereby reduce the resulting circuit size. In addition, it was also found that such a configuration also enhances the performance.

Figure 3:
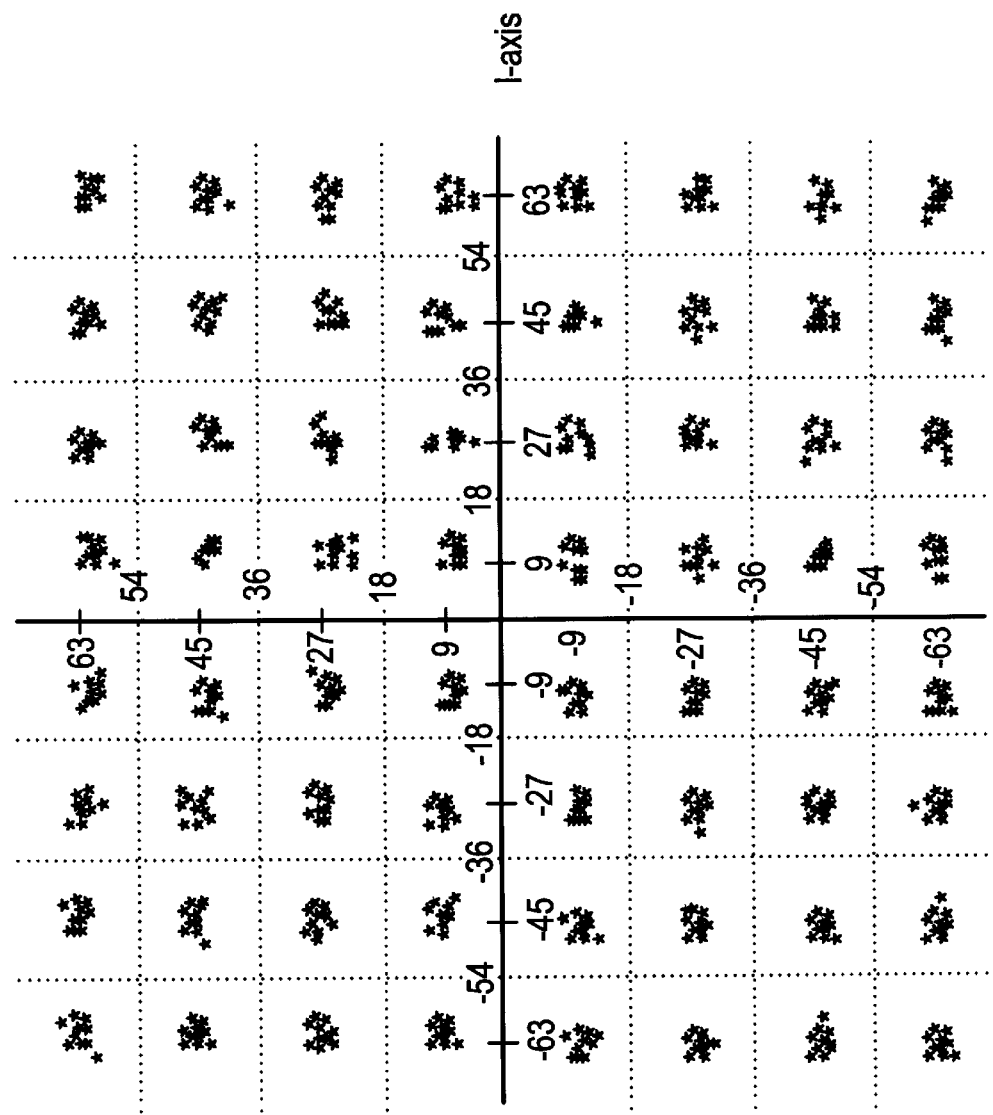
FIG. 3 is a constellation of the signal waveform equalizer apparatus of the first embodiment.
Figure 4:
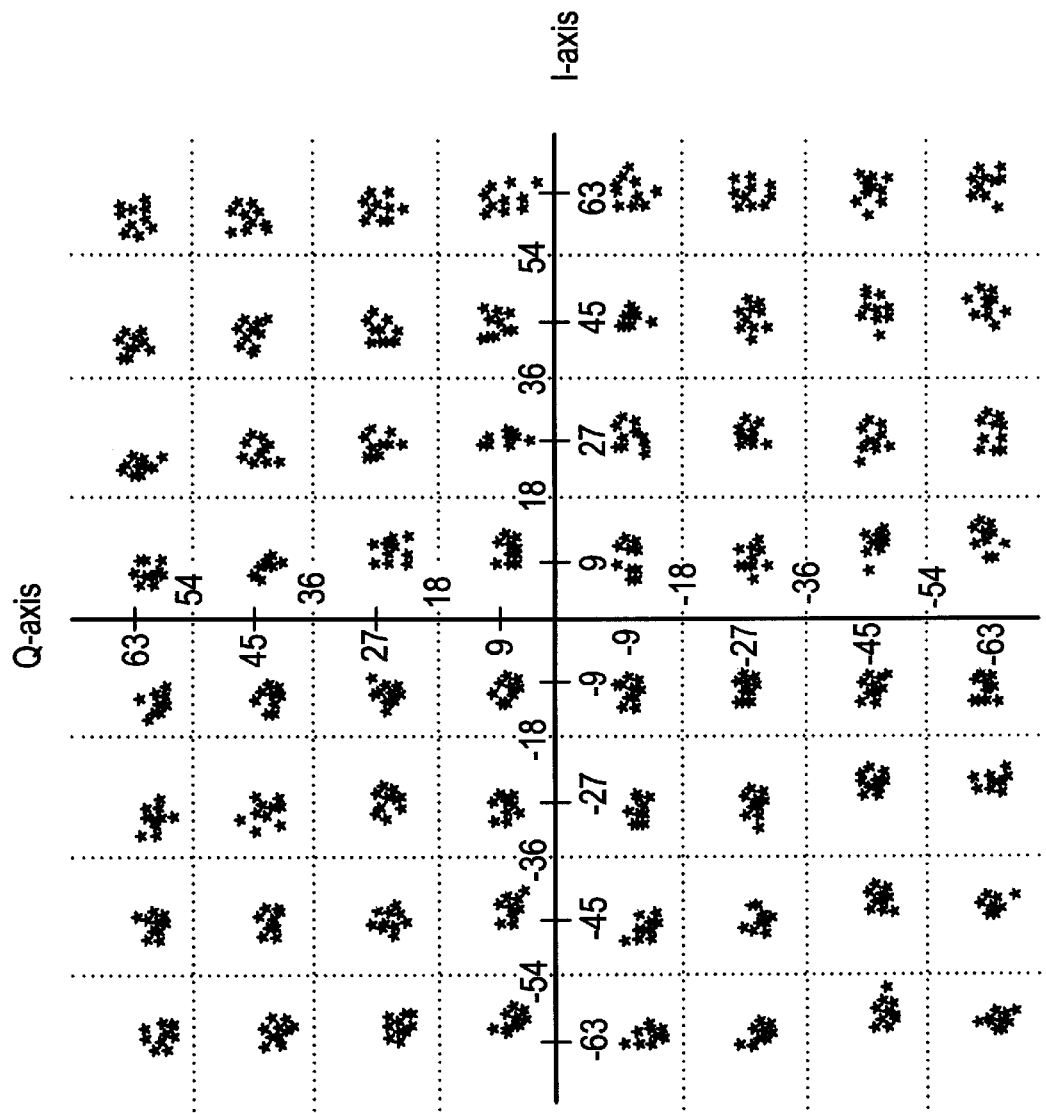
FIG. 4 is a constellation of a signal waveform equalizer apparatus of a comparative example, in which an AFC/APC block is disposed posterior to a waveform equalization section.

FIG. 3 is a constellation obtained by performing a simulation in this embodiment. FIG. 4 is also a constellation, obtained by performing a simulation, of a comparative example, in which an AFC/APC block is disposed posterior to the overall waveform equalization section 1. As can be understood, equalized signals are more concentrated about the position of a corresponding signal point in the constellation shown in FIG. 3 than in the constellation shown in FIG. 4. Thus, this embodiment is superior in performance to the comparative example.

Embodiment 2

In the second embodiment of the present invention, the FFE filter section 12 and the DFE filter section 22 of the signal waveform equalizer apparatus shown in FIG. 1 are each divided into a pre-filter and a post-filter, and each filter has a complex operation section having the same configuration.

Hereinafter, the signal waveform equalizer apparatus of the second embodiment will be described in detail. In this embodiment, in both the FFE filter section 12 and the DFE filter section 22, the number of taps of a filter is assumed to be eight.

Figure 5:
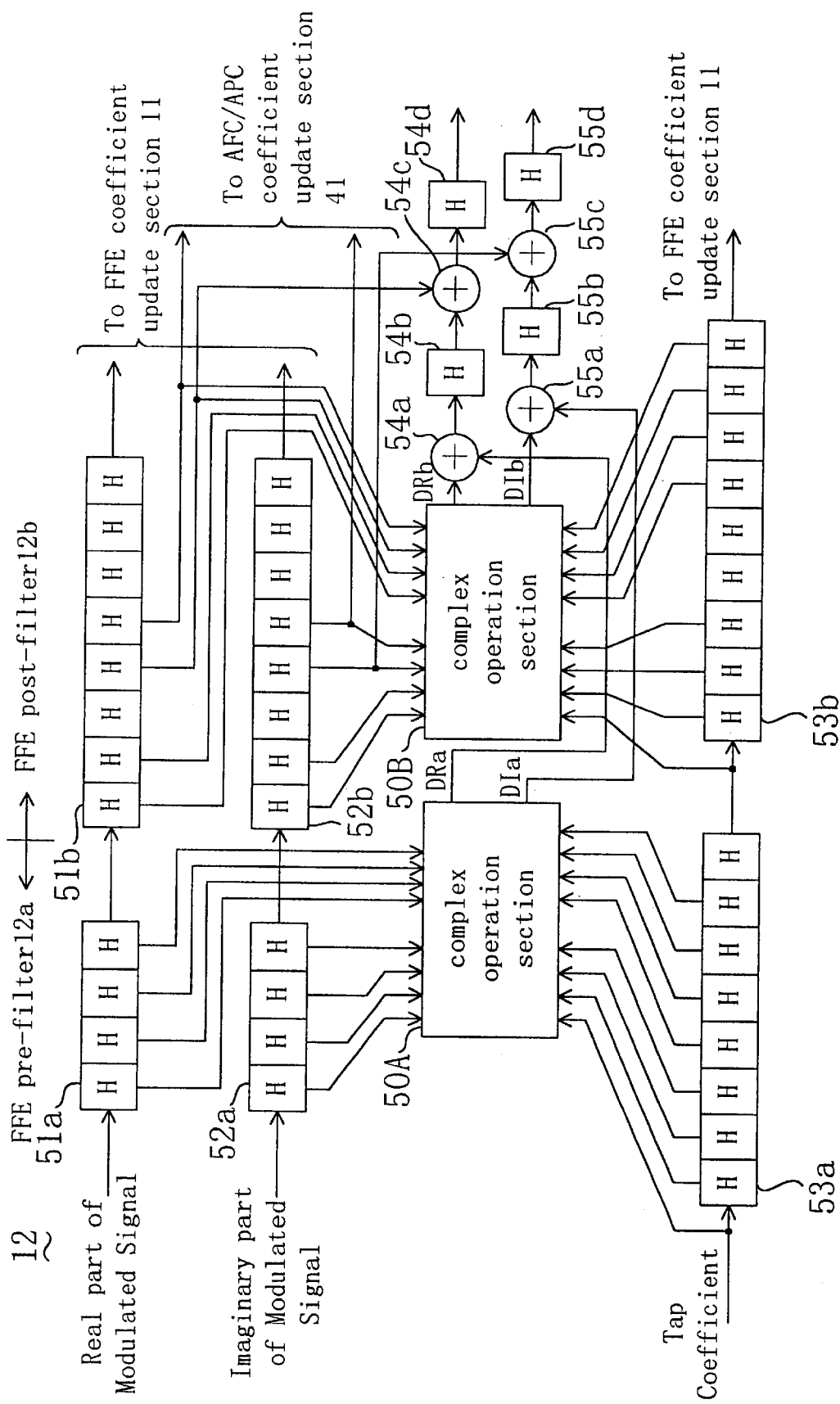
FIG. 5 is a diagram illustrating a configuration for an FFE filter section of a signal waveform equalizer apparatus in the second embodiment of the present invention.

FIG. 5 is a diagram illustrating a configuration for the FFE filter section 12 of the signal waveform equalizer apparatus of the second embodiment. In FIG. 5, the reference numerals 50A and 50B denote complex operation sections implemented by complex operation macros to be described in detail later. 51a and 51b denote respective banks of data holders for sequentially holding real parts of modulated signals. 52a and 52b denote respective banks of data holders for sequentially holding imaginary parts of the modulated signals. 53a and 53b denote respective banks of data holders for sequentially holding tap coefficients. 54a and 54c denote respective adders for calculating real parts. 55a and 55c denote respective adders for calculating imaginary parts. And 54b, 54d, 55b and 55d denote respective data holders.

The banks of data holders 51a, 52a and 53a and the complex operation section 50A constitute an FFE pre-filter 12a. On the other hand, the banks of data holders 51b, 52b and 53b, the complex operation section 50B, the adders 54a, 54c, 55a, 55c and the data holders 54b, 54d, 55b, 55d constitute an FFE post-filter 12b.

In the FFE pre-filter 12a, the banks 51a and 52a of data holders respectively hold the real parts and the imaginary parts of modulated signals, which have been subjected to multivalued modulation and then externally transmitted sequentially. On the other hand, the bank 53a of data holders holds the tap coefficients produced and output by the FFE coefficient update section 11. In this embodiment, the tap coefficient is transferred at a rate twice as high as the rate at which the modulated signal is transferred. The bank 53a of data holders is formed to serially transfer the real parts and imaginary parts of the tap coefficients. The complex operation section 50A performs a complex operation by using the real and imaginary parts of the four modulated signals held in the banks 51a and 52a of data holders and the real and imaginary parts of the four tap coefficients held in the bank 53a of data holders and by selecting appropriate data. The complex operation section 50A outputs a real part DRa and an imaginary part DIa as the results of operation to the FFE post-filter 12b.

In the FFE post-filter 12b, the banks 51b and 52b of data holders respectively hold the real and imaginary parts of the modulated signals, which are once held in the banks 51a and 52a of data holders of the FFE pre-filter 12a and then output therefrom. On the other hand, the bank 53b of data holders holds the tap coefficients which are once held in the bank 53a of data holders of the FFE pre-filter 12a and then output therefrom. As in the FFE pre-filter 12a, the tap coefficient is transferred at a rate twice as high as the rate at which the modulated signal is transferred. The bank 53b of data holders is formed to serially transfer the real and imaginary parts of the tap coefficients. The complex operation section 50B performs a complex operation by using the real and imaginary parts of the four modulated signals held in the banks 51b and 52b of data holders and the real and imaginary parts of the four tap coefficients held in the bank 53b of data holders and by selecting appropriate data. The complex operation section 50B outputs a real part DRb and an imaginary part DIb as the results of operation.

The real part DRb obtained by the complex operation section 50B of the FFE post-filter 12b as the result of operation and the real part DRa obtained by the complex operation section 50A of the FFE pre-filter 12a as the result of operation are added together by the adder 54a. And the sum is retained in the holder 54b. The data retained in the holder 54b and the real part of an appropriate one of the modulated signals held in the bank 51b of data holders are added together by the adder 54c. The sum is retained in the holder 54d and then output as the real part of the resultant data of the FFE filter section 12. Similarly, the imaginary part DIb obtained by the complex operation section 50B of the FFE post-filter 12b as the result of operation and the imaginary part DIa obtained by the complex operation section 50A of the FFE pre-filter 12a as the result of operation are added together by the adder 55a. And the sum is retained in the holder 55b. The data retained in the holder 55b and the imaginary part of an appropriate one of the modulated signals held in the bank 52b of data holders are added together by the adder 55c. The sum is retained in the holder 55d and then output as the imaginary part of the resultant data of the FFE filter section 12.

Figure 6:
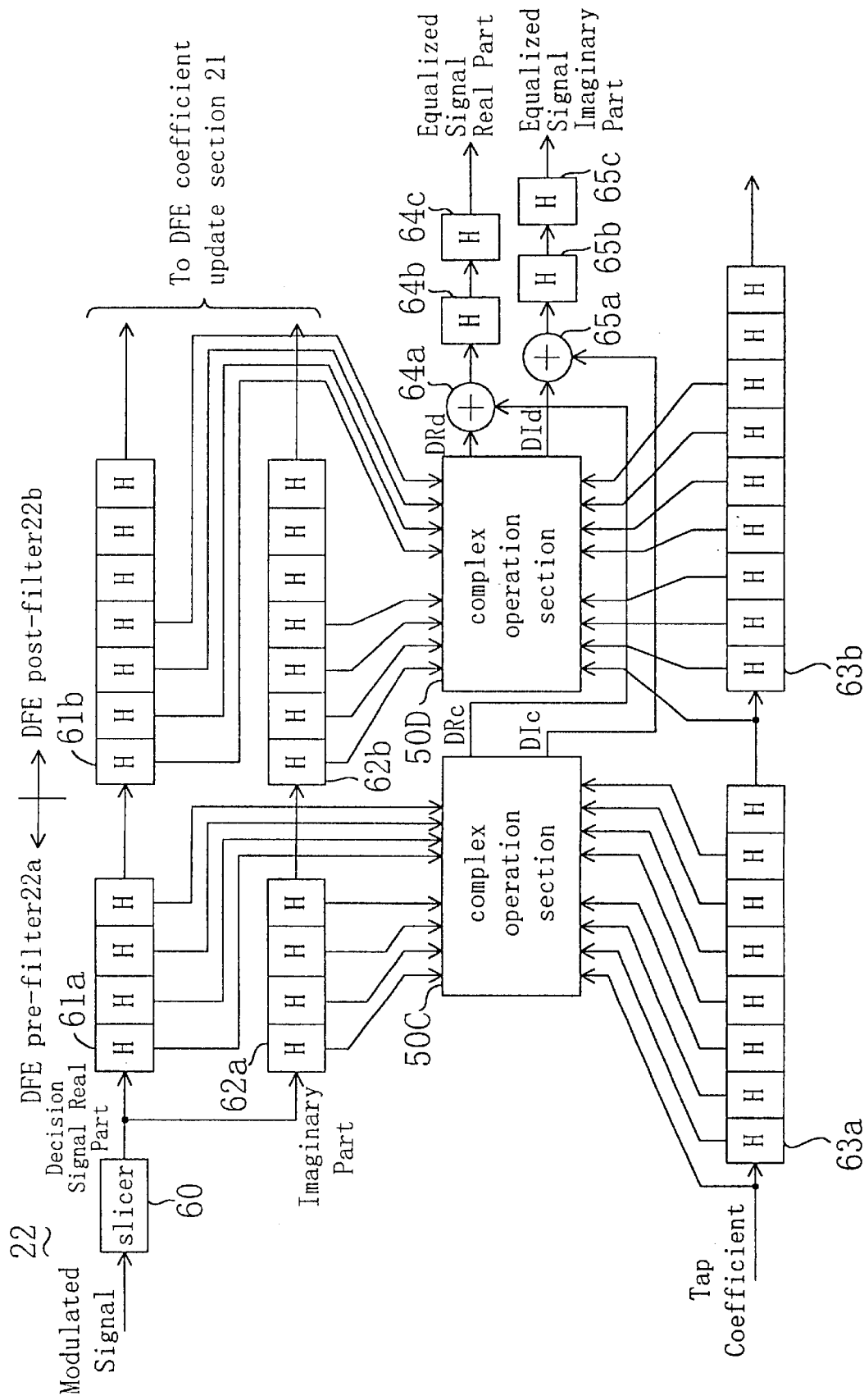
FIG. 6 is a diagram illustrating a configuration for a DFE filter section of the signal waveform equalizer apparatus of the second embodiment.

FIG. 6 is a diagram illustrating a configuration for the DFE filter section 22 of the signal waveform equalizer apparatus of the second embodiment. In FIG. 6, the reference numerals 50C and 50D denote complex operation sections implemented by complex operation macros to be described in detail later. 60 denotes a slicer for converting a modulated signal, from which the frequency and phase errors have been removed by the AFC/APC block 40, into a decision signal. 61a and 61b denote respective banks of data holders for sequentially holding real parts of the decision signals. 62a and 62b denote respective banks of data holders for sequentially holding imaginary parts of the decision signals. 63a and 63b denote respective banks of data holders for sequentially holding tap coefficients. 64a denotes an adder for calculating a real part. 65a denotes an adder for calculating an imaginary part. And 64b, 64c, 65b and 65c denote respective data holders.

The slicer 60, the banks 61a, 62a and 63a of data holders and the complex operation section 50C constitute a DFE pre-filter 22a. On the other hand, the banks 61b, 62b and 63b of data holders, the complex operation section SOD, the adders 64a and 65a and the data holders 64b, 64c, 65b, 65c constitute a DFE post-filter 22b.

In the DFE pre-filter 22a, the banks 61a and 62a of data holders respectively retain the real parts and the imaginary parts of the decision signals. On the other hand, the bank 63a of data holders retains the tap coefficients produced and output by the DFE coefficient update section 21. As in the FFE filter section 12, the tap coefficient is transferred at a rate twice as high as the rate at which the decision signal is transferred. The bank 63a of data holders is formed to serially transfer the real and imaginary parts of the tap coefficients. The complex operation section 50C performs a complex operation by using the real and imaginary parts of the four decision signals retained in the banks 61a and 62a of data holders and the real and imaginary parts of the four tap coefficients retained in the bank 63a of data holders and by selecting appropriate data. The complex operation section 50C outputs a real part DRc and an imaginary part DIc as the results of operation to the DFE post-filter 22b.

In the DFE post-filter 22b, the banks 61b and 62b of data holders respectively retain the real and imaginary parts of the decision signals, which are once retained in the banks 61a and 62a of data holders of the DFE pre-filter 22a and then output therefrom. On the other hand, the bank 63b of data holders retains the tap coefficients which are once retained in the bank 63a of data holders of the DFE pre-filter 22a and then output therefrom. As in the DFE pre-filter 22a, the tap coefficient is transferred at a rate twice as high as the rate at which the decision signal is transferred. The bank 63b of data holders is formed to serially transfer the real and imaginary parts of the tap coefficients. The complex operation section 50D performs a complex operation by using the real and imaginary parts of the four decision signals retained in the banks 61b and 62b of data holders and the real and imaginary parts of the four tap coefficients retained in the bank 63b of data holders and by selecting appropriate data. The complex operation section 50D outputs a real part DRd and an imaginary part DId as the results of operation.

The real part DRd obtained by the complex operation section 50D of the DFE post-filter 22b as the result of operation and the real part DRc obtained by the complex operation section 50C of the DFE pre-filter 22a as the result of operation are added together by the adder 64a. And the sum is retained in the holder 64b. The data retained in the holder 64b is further retained in the holder 64c and then output as the real part of the resultant data of the DFE filter section 22. Similarly, the imaginary part DId obtained by the complex operation section 50D of the DFE post-filter 22b as the result of operation and the imaginary part DIc obtained by the complex operation section SOC of the DFE pre-filter 22a as the result of operation are added together by the adder 65a. And the sum is retained in the holder 65b. The data retained in the holder 65b is further retained in the holder 65c and then output as the imaginary part of the resultant data of the DFE filter section 22.

Figure 7:
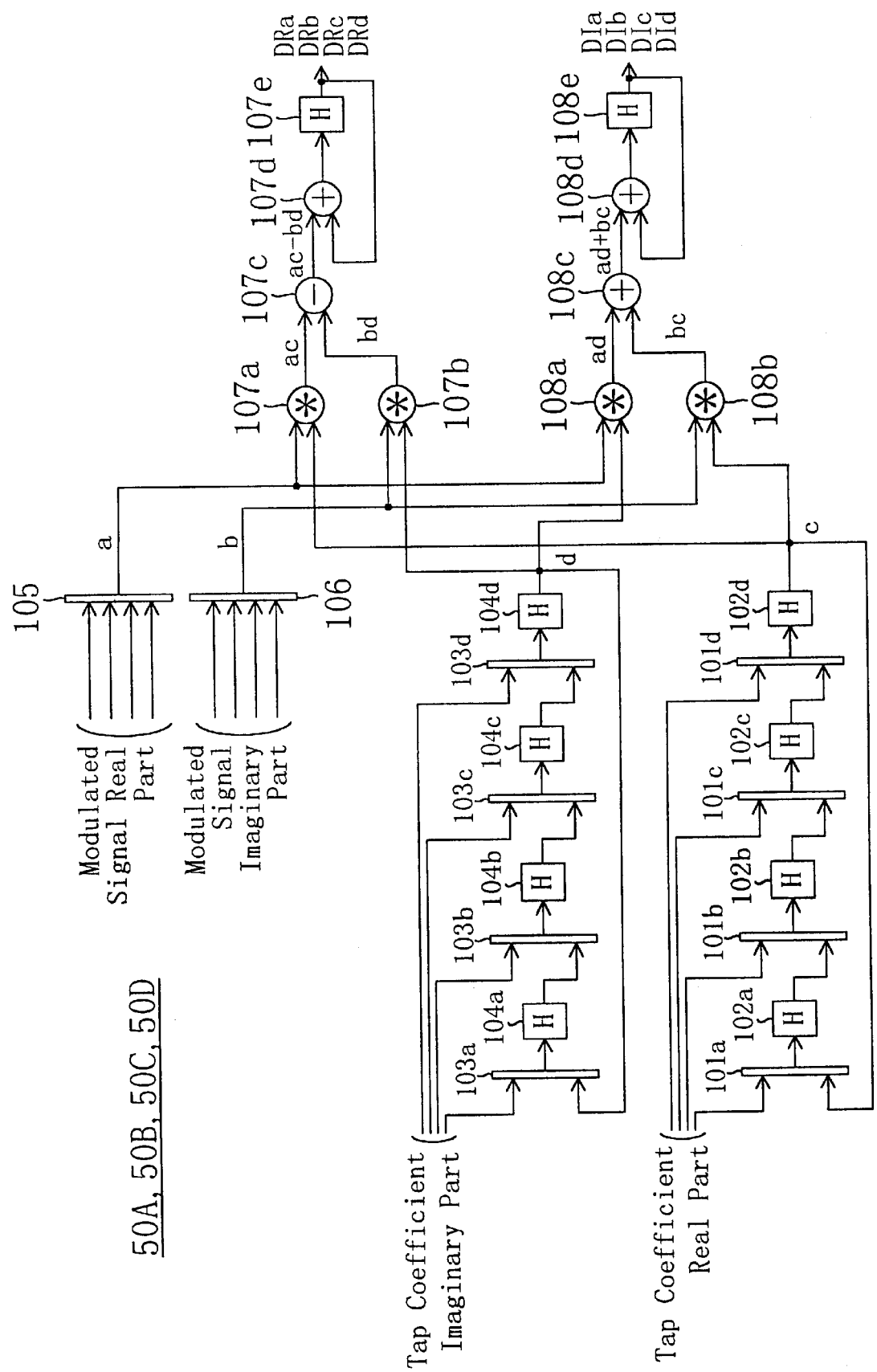
FIG. 7 is a diagram illustrating a configuration for a complex operation macro used for the FFE and DFE filter sections of the signal waveform equalizer apparatus of the second embodiment.

FIG. 7 is a diagram illustrating a configuration for a complex operation macro used in this embodiment. This complex operation macro performs multiplexing and complex multiplication on the tap coefficients for four taps and modulated signals to be equalized, and is used as the complex operation section 50A, 50B of the FFE filter section 12 shown in FIG. 5 and as the complex operation section 50C, 50D of the DFE filter section 22 shown in FIG. 6.

In FIG. 7, the reference numerals 101a through 10d and 103a through 103d denote selectors, and 102a through 102d and 104a through 104d denote data holders. The real parts of the tap coefficients for four taps are input in parallel to each other, serially converted by the selectors 101a through 101d and the data holders 102a through 102d into a real part for one tap and then output as a serial output c from the data holder 102d. Similarly, the imaginary parts of the tap coefficients for four taps are input in parallel to each other, serially converted by the selectors 103a through 103d and the data holders 104a through 104d into an imaginary part for one tap and then output as a serial output d from the data holder 104d. The serial outputs c and d are input to the selectors 101a and 103a, respectively. That is to say, both the real and imaginary parts of a tap coefficient have cyclic data.

On the other hand, data for one tap is selected at an appropriate time by the selector 105 from the real parts of the four modulated signals to be equalized and is output as a real part a. Similarly, data for one tap is selected at an appropriate time by the selector 106 from the imaginary parts of the four modulated signals to be equalized and is output as an imaginary part b.

The real part a and the imaginary part b of a selected modulated signal and the real part c and the imaginary part d of a selected tap coefficient are prepared in this manner and used for a complex multiplication given by the following equation.

$$(a+bj)(c+dj)=(ac-bd)+(ad+bc)j$$

A multiplier 107a calculates ac in this equation and a multiplier 107b calculates bd in this equation. A multiplier 108a calculates ad in this equation and a multiplier 108b a calculates bc in this equation. A subtracter 107c subtracts bd calculated by the multiplier 107b from ac calculated by the multiplier 107a, thereby obtaining (ac−bd) as a real part in the complex operation. On the other hand, an adder 108c adds together ad calculated by the multiplier 108a and bc calculated by the multiplier 108b, thereby obtaining (ad+bc) as an imaginary part in the complex operation.

An adder 107d adds together the real part (ac−bd) calculated by the subtracter 107c and the data retained in a data holder 107e and the sum is held in the data holder 107e. On the other hand, in totally the same way, an adder 108d adds together the imaginary part (ad+bc) calculated by the adder 108c and the data retained in a data holder 108e and the sum is held in the data holder 108e.

In this way, after real and imaginary parts for each tap are calculated one by one for a complex operation, the adders 107d and 108d and the data holders 107e and 108e sequentially add together these real and imaginary parts, thereby outputting resultant real and imaginary parts for four taps.

Figure 8:
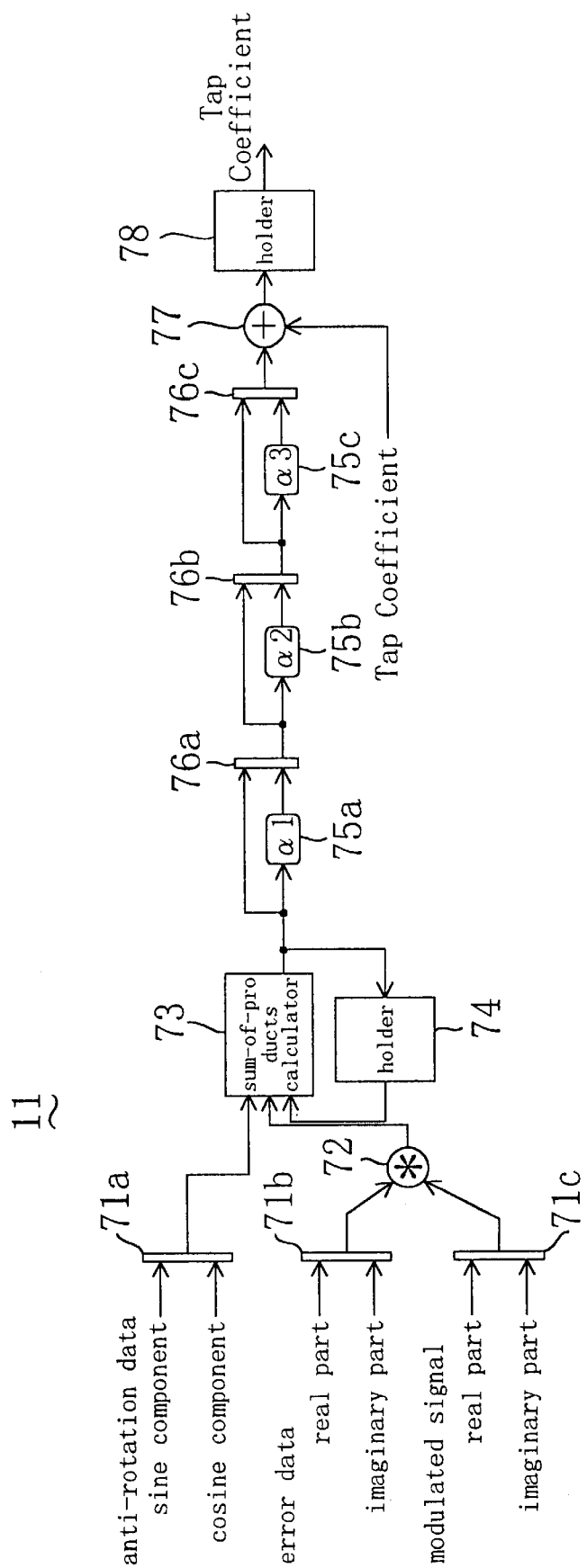
FIG. 8 is a diagram illustrating a configuration for an FFE coefficient update section of the signal waveform equalizer apparatus of the second embodiment.

FIG. 8 is a diagram illustrating a configuration for the FFE coefficient update section 11 of the signal waveform equalizer apparatus in this embodiment. The FFE coefficient update section 11 calculates the coefficient to be updated basically in accordance with the STOP & GO algorithm as represented by Equations (6) and (7). In this embodiment, a complex multiplication of anti-rotation data is additionally performed. That is to say, the FFE coefficient update section 11 shown in FIG. 8 has a circuit configuration in which the coefficient update processing as represented by Equations (6) and (7) and complex multiplication processing of anti-rotation data are multiplexed.

In FIG. 8, a selector 71a selectively outputs the sine or cosine component of the anti-rotation data that has been output by the AFC/APC block 40 to remove errors from the phase and frequency components. Similarly, a selector 71b selectively outputs the real or imaginary part of the error data output from the error estimation block 30. And a selector 71c selectively outputs the real or imaginary part of the modulated signal that has been retained and then output at an appropriate time by the FFE filter section 12.

The real or imaginary part of the error data selectively output by the selector 71b and the real or imaginary part of the modulated signal selectively output by the selector 71c are multiplied together by a multiplier 72. And the product is input to a sum-of-products calculator 73. The sum-of-products calculator 73 multiplies together the sine or cosine component of the anti-rotation data selectively output by the selector 71a and the product obtained by the multiplier 72, and adds the sum of products, which is retained in a data holder 74, to this product, thereby outputting a new sum of products. This new sum of products is also retained in the data holder 74.

Next, the multiplication of the step parameter α in Equations (6) and (7) is performed. In the FFE coefficient update section 11 shown in FIG. 8, the multiplication of the step parameter α is performed by bit shifting. In FIG. 8, the reference numerals 75a, 75b and 75c denote bit shifters for multiplying the step parameters α1, α2 and α3, respectively, and 76a, 76b and 76c denote selectors. The selector 76a selectively outputs the sum of products output by the sum-of-products calculator 73, or the data obtained by the bit shifter 75a multiplying the sum of products by α1. The selector 76b selectively outputs the output data of the selector 76a, or the data obtained by the bit shifter 75b multiplying the output data by α2. The selector 76c selectively outputs the output data of the selector 76b, or the data obtained by the bit shifter 75c multiplying the output data by α3. By setting the respective selectors 76a, 76b and 76c to select an appropriate combination of data and by modifying the setting if necessary, the multiplication operations of the step parameters having eight kind of values can be performed without using any multiplier. Also, by changing the number of bit shifters or the number of bit shifting, the combination of step parameters to be multiplied may be changed.

The output data of the selector 76c is added by an adder 77 to the tap coefficient that has been retained and then output at an appropriate time by the FFE filter section 12. The sum is the newly updated tap coefficient, which is retained in a holder 78 and then output as a new tap coefficient.

Figure 9:
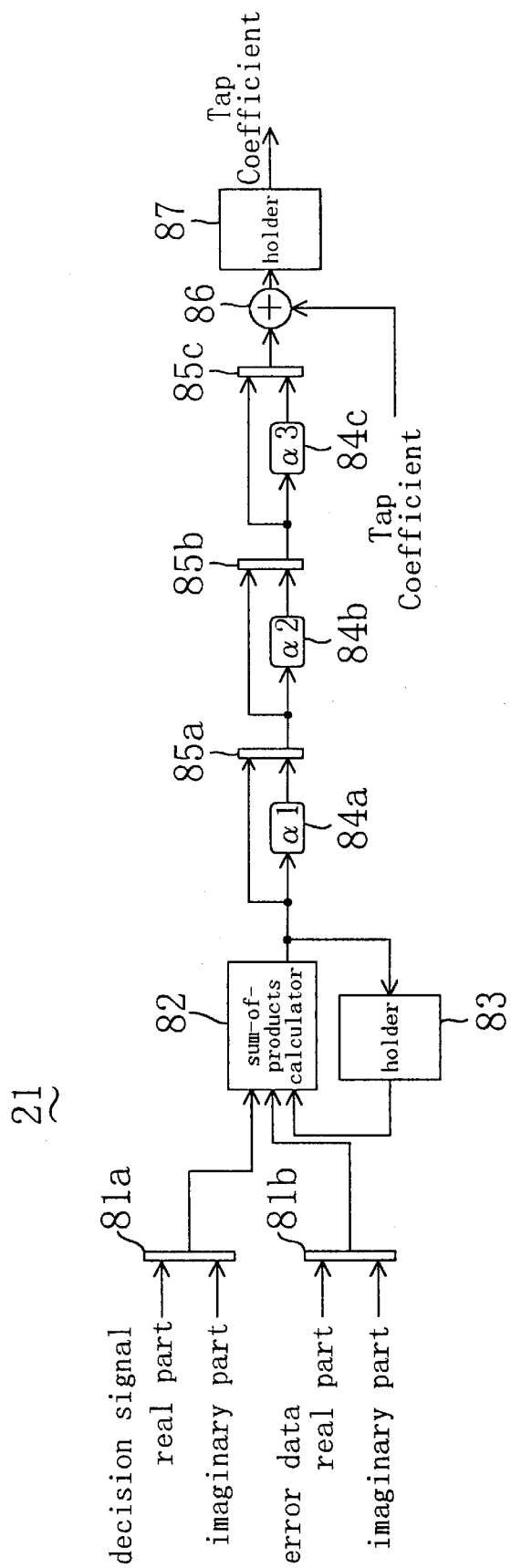
FIG. 9 is a diagram illustrating a configuration for a DFE coefficient update section of the signal waveform equalizer apparatus of the second embodiment.

FIG. 9 is a diagram illustrating a configuration for the DFE coefficient update section 21 of the signal waveform equalizer apparatus in this embodiment. The DFE coefficient update section 21 calculates the coefficient to be updated basically in accordance with the STOP & GO algorithm as represented by Equations (6) and (7). The DFE coefficient update section 21 shown in FIG. 9 updates the coefficient of the DFE block 20. Thus, the decision signal, obtained as a result of processing by the FFE block 10 and the AFC/APC block 40, is input to the DFE coefficient update section 21. Accordingly, the DFE coefficient update section 21 has a circuit configuration in which the coefficient update processing and complex multiplication processing on this decision signal and the error data are multiplexed.

In FIG. 9, a selector 81a selectively outputs the real or imaginary part of the decision signal that has been retained and then output at an appropriate time by the DFE filter section 22. A selector 81b selectively outputs the real or imaginary part of the error data output from the error estimation block 30. A sum-of-products calculator 82 multiplies together the real or imaginary part of the decision signal selectively output by the selector 81a and the real or imaginary part of the error data selectively output by the selector 81b, and adds the sum of products, which is retained in a data holder 83, to this product, thereby outputting a new sum of products. This new sum of products is also retained in the data holder 83.

Next, the multiplication of the step parameter a in Equations (6) and (7) is performed. In the DFE coefficient update section 21 shown in FIG. 9, the multiplication of the step parameter α is performed by bit shifting as in the FFE coefficient update section 11 shown in FIG. 8. In FIG. 9, the reference numerals 84a, 84b and 84c denote bit shifters for multiplying the step parameters α1, α2 and α3, respectively, and 85a, 85b and 85c denote selectors. The selector 85a selectively outputs the sum of products output by the sum-of-products calculator 82, or the data obtained by the bit shifter 84a multiplying the sum of products by α1. The selector 85b selectively outputs the output data of the selector 85a, or the data obtained by the bit shifter 84b multiplying the output data by α2. The selector 85c selectively outputs the output data of the selector 85b, or the data obtained by the bit shifter 84c multiplying the output data by α3. By setting the respective selectors 85a, 85b and 85c to select an appropriate combination of data and by modifying the setting if necessary, the multiplication operations of the step parameters having eight kind of values can be performed without using any multiplier. Also, by changing the number of bit shifters or the number of bit shifting, the combination of the step parameters to be multiplied may be changed.

The output data of the selector 85c is added by an adder 86 to the tap coefficient that has been retained and then output at an appropriate time by the DFE filter section 22. The sum is the newly updated tap coefficient, which is once retained in a holder 87 and then output as a new tap coefficient.

Figure 10:
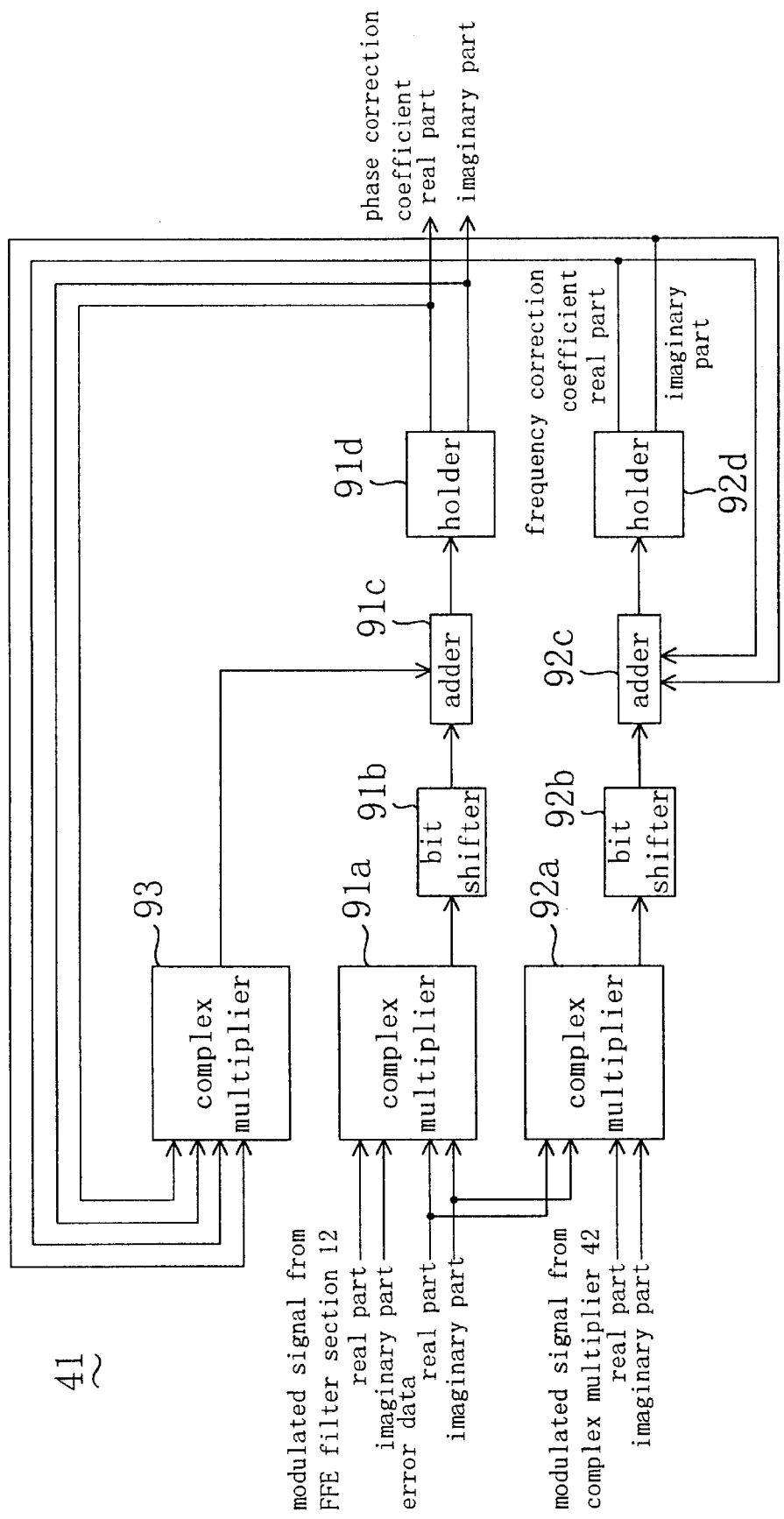
FIG. 10 is a diagram illustrating a configuration for an AFC/APC coefficient update section of the signal waveform equalizer apparatus of the second embodiment.

FIG. 10 is a diagram illustrating a configuration for the AFC/APC coefficient update section 41 of the signal waveform equalizer apparatus in this embodiment. The AFC/APC coefficient update section 41 calculates the coefficient to be updated basically in accordance with the LMS algorithm as represented by Equations (8) and (9).

First, the calculation represented by Equation (8) will be described. A complex multiplier 91a performs a complex multiplication on the real and imaginary parts of the error data and the real and imaginary parts of the modulated signal output from the FFE filter section 12. This product is further multiplied by the step size represented by Equation (8). In this embodiment, the multiplication of the step size is performed by bit shifting and the values that can be multiplied by bit shifting are defined as step sizes. A bit shifter 91b multiplies together the product obtained by the complex multiplier 91a and a step size. On the other hand, a complex multiplier 93 performs a complex multiplication on the real and imaginary parts of a frequency correction coefficient yet to be updated and the real and imaginary parts of a phase correction coefficient yet to be updated and then outputs the product.

Thus, if the output data of the bit shifter 91b and the output data of the complex multiplier 93 are added together by an adder 91c, then the operation represented by Equation (8) is realized. A holder 91d retains the output data of the adder 91c, i.e., the phase correction coefficient, and then outputs the real and imaginary parts thereof. This phase correction coefficient is used as a phase correction coefficient yet to be updated, which is required for performing the next operation in accordance with Equation (8).

Next, the calculation represented by Equation (9) will be described. By substituting Equation (8) into $H_{n+1}$ on the right side of Equation (9), Equation (9) is modified as follows:

$$F_{n+1} = F_n + \mu f \mu (D_n - H_n U_n) U_n^* H_n^* \quad (10)$$

A complex multiplier 92a performs a complex multiplication on the real and imaginary parts of the error data and the real and imaginary parts of the modulated signal, which is the product obtained by the complex multiplier (tap) 42. In this embodiment, the multiplication of a step size is performed by bit shifting as in the operation to update the phase correction coefficient in accordance with Equation (8). A bit shifter 92b multiplies together the product obtained by the complex multiplier 92a and a step size.

Thus, if the output data of the bit shifter 92b and the real and imaginary parts of the frequency correction coefficient yet to be updated, which have been output from a holder 92d, are added together by an adder 92c, then the operation represented by Equation (10) is realized. The holder 92d retains the output data of the adder 92c, i.e., the frequency correction coefficient, and then outputs the real and imaginary parts thereof. This frequency correction coefficient is used as a frequency correction coefficient yet to be updated, which is required for performing the next operation in accordance with Equation (10).

As is apparent from the foregoing description, the signal waveform equalizer apparatus of the present invention includes a waveform equalization section for equalizing the waveform of a modulated signal and an AFC/APC block for removing the frequency and phase errors from the modulated signal. In this apparatus, the AFC/APC block operates in accordance with the LMS algorithm as the waveform equalization section does. Thus, the AFC/APC block can be implemented by a tap and a coefficient update section that have the same function as that of the waveform equalization section. In addition, the AFC/APC block uses an error estimation block in common with the waveform equalization section. As a result, the AFC/APC function can be integrated into the signal waveform equalizer apparatus and the circuit size thereof can be reduced considerably.

What is claimed is:

1. A signal waveform equalizer apparatus for equalizing the waveform of a signal, which has been subjected to multi-valued modulation and transmitted, with the waveform of an original signal yet to be transmitted, the apparatus comprising:

a waveform equalization section for equalizing the input modulated signal in accordance with a least mean square (LMS) algorithm;

an error estimation block for producing error data required for the waveform equalization section to update equalization coefficients; and an auto frequency control (AFC)/auto phase control (APC) block for removing frequency and phase errors from the input modulated signal, wherein the AFC/APC block removes the frequency and phase errors from the input modulated signal in accordance with the LMS algorithm and updates the coefficients by using the error data produced by the error estimation block.

2. The apparatus of claim 1, wherein the waveform equalization section is divided into an anterior stage and a posterior stage, and wherein the modulated signal, output from the anterior stage of the waveform equalization section, is input to the AFC/APC block and an output signal of the AFC/APC block is input to the posterior stage of the waveform equalization section.

3. The apparatus of claim 2, wherein the anterior stage of the waveform equalization section is a feed forward equalizer (FFE) block and the posterior stage of the waveform equalization section is a decision feedback equalizer (DFE) block.

4. The apparatus of claim 3, wherein the FFE block includes an FFE filter section that is divided into an FFE pre-filter and an FFE post-filter, and wherein the DFE block includes a DFE filter section that is divided into a DFE pre-filter and a DFE post-filter, and wherein each of the FFE pre- and post-filters and the DFE pre- and post-filters includes a complex operation macro having the same configuration.

5. A signal waveform equalizer apparatus for equalizing the waveform of a signal, which has been subjected to multi-valued modulation and transmitted, with the waveform of an original signal yet to be transmitted, the apparatus comprising:

a waveform equalization section for equalizing the input modulated signal in accordance with an LMS algorithm; and an AFC/APC block for removing frequency and phase errors from the input modulated signal, wherein the AFC/APC block includes a single tap for multiplying the input modulated signal by a coefficient for removing the frequency and phase errors, and an AFC/APC coefficient update section for updating the coefficient in accordance with the LMS algorithm.

6. The apparatus of claim 5, wherein the waveform equalization section includes an anterior stage and a posterior stage, each of these stages including a filter section and a coefficient update section, and wherein the modulated signal, output from the anterior stage of the waveform equalization section, is input to the AFC/APC block and an output signal of the AFC/APC block is input to the posterior stage of the waveform equalization section, and wherein the filter sections of the anterior and posterior stages of the waveform equalization section have the same number of taps.

* * * * *